Patented July 8, 1947

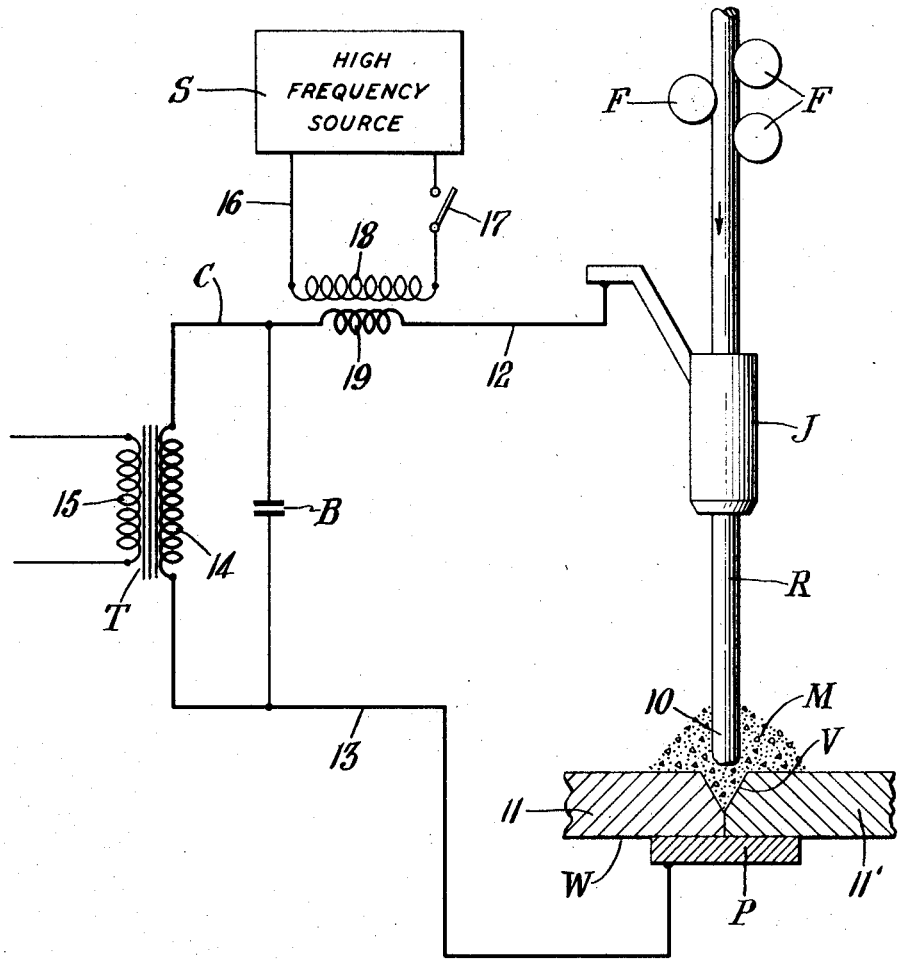

2,423,515

UNITED STATES PATENT OFFICE 2,423,515

REPETITIVE BLANKETED ELECTRIC FUSION WELDING WITH HIGH-FREQUENCY STARTING

Edward D. Morris, Chicago, Ill., assignor to The Linde Air Products Company, a corporation of Ohio Application August 22, 1942, Serial No. 455,791

1 Claim. (Cl. 219—10)

This invention relates to welding and more particularly to blanketed electric welding.

Blanketed electric welding is a process using the heat generated by the passage of a very heavy electric current from a bare fusible metal electrode to the work being welded, the end of the electrode and the portions of the work to be welded being constantly covered or blanketed by a deep layer of a welding medium consisting principally of granulated mineral-like material that is substantially non-conductive electrically when cold and is a high-resistance electrical conductor when molten. This granulated material is laid down in a deep layer upon the adjacent edges or surfaces of the workpieces to be welded and the entire welding action takes place beneath it without an open visible arc and with little or no spatter, smoke or flash. Within the layer of granulated material an intense, concentrated heat is generated by the electric current, and in the welding zone so established portions of the electrode, welding medium, and metal of the workpieces are melted. Molten metal from the electrode is thoroughly mixed with the melted metal of the workpieces to form the weld. When a weld is being made a sub-surface layer of the granulated material melts and floats as a liquid blanket over the molten weld metal. This molten blanket cools and solidifies, and is readily detached from the weld.

Bare welding rod is usually fed mechanically into the welding zone at a rate automatically correlated with the welding voltage or welding current. Granulated welding material is usually laid down mechanically and, since only a part of the granulated material next to the weld is fused during the welding, the upper, unfused material is usually picked up by suction and returned to a hopper for reuse, thus making the entire operation automatic or semi-automatic.

Heretofore, since the granulated welding medium is not a conductor of electricity when it is cold, a special fuse, such as a wad of steel wool for example, has been used to start the weld. Such fuse was spaced in the welding circuit between the work and the end of the welding rod; and the fuse, the end of the welding rod and the adjoining parts of the work were covered with granulated material so that, when the welding current was turned on, the fuse functioned as a resistor and became sufficiently hot to melt the adjacent layer of granulated material to permit the welding operation to continue, the welding composition being progressively fused by the heat generated as the welding proceeded. The use of a ball of steel wool constituted the standard means which existed, up to the time of the present invention, for initiating the welding action underneath the blanket of granulated material. However, since the ball or wad of steel wool has to be inserted underneath the welding rod and the blanket of powdered material by hand each time the welding process is started, rapid repetitive and automatic starting by this method is impractical.

The main objects of this invention, therefore, are to provide an improved method of initiating blanketed electric welding; a blanketed electric welding process employing an entirely automatic starting system, in which the use of a starting fuse is entirely eliminated; a blanketed electric welding process employing a high-frequency electrical discharge to initiate the process in which the starting action takes place with the end of the welding electrode immersed in and blanketed by an electric welding compound; and a repetitive blanketed electric welding process that is rapid and automatic.

In accordance with the invention, the end of the fusible metal welding rod or electrode is first spaced a predetermined distance from the work to provide a gap of predetermined length under the blanket of granulated welding material that is substantially non-conductive when cold. Particles of such welding material are introduced within and bridge the gap between the work and the end of the welding rod. A welding voltage is applied across such gap of sufficient value to cause a welding current to flow between the rod and work after the granulated welding material has been fused sufficiently to conduct the welding current but insufficient in itself to start the current flow through the cold material. To start the welding action, a high-frequency auxiliary voltage is applied across such gap of sufficient value to establish a high-frequency discharge path between the rod and work, and the presence of the particles of welding material which bridge the gap localizes such discharge relatively to the work, i. e., to the starting point for the welding operation. The welding current then flows along the localized electrically conductive path so established by the high-frequency discharge. Thus, the present process is characterized by the use of an auxiliary radio frequency current in addition to the welding current, the flow of the latter being started by the ionization of a path through a portion of the blanket of the granulated material by the radio frequency current.

A high-frequency source of electrical energy is provided which may be any radio frequency oscillator capable of developing the necessary high voltage to establish a discharge path between the submerged or blanketed electric welding electrode and the work. Frequencies of upwards of 1000 kilocycles are satisfactory. According to the invention, the high-frequency source is inductively coupled to the electric welding circuit so that the necessary voltage and current are developed across the gap between the rod and the work, the main welding current passing through the secondary coil of the inductive coupling without overloading it. In operation, the blanketed electric welding process is carried out as it would be normally, with the exception that the rod-to-work distance is set to provide a gap of predetermined length and the high-frequency unit is energized to start the welding operation automatically and is either then shut off or left on continuously during the welding operation.

Referring to the drawing, there is illustrated a simplified wiring diagram exemplifying the invention.

A fusible metal welding rod R is adapted to be fed through contact jaw means J by feed rollers F, the rollers F being driven by a rod feed motor (not shown) in conventional manner. The lower end portion 10 of the rod R projects downwardly into a mass of granulated welding material M which covers the submerged end of the rod R and the portion V of the work to be welded, in this case metal members 11, 11' having their abutting edges shaped to form a Y. When the welding material M is deposited to cover the end of the rod R and the adjoining portion of the work, particles of such material are introduced or flow into and bridge the gap between the work and the end of the rod R. Mounted upon the work and in direct contact therewith is a contact plate P, the plate P being disposed under the portion V between the members 11, 11' as shown.

The contact jaws J and plate P are connected in series circuit relation with a welding circuit C comprising conductors 12 and 13. Although direct current may be used, the input terminals of these conductors are preferably connected to the secondary winding 14 of a welding transformer T, the primary circuit winding 15 of which is connected to the main electric welding power supply, preferably single phase alternating current on an open circuit voltage of about 85 to 100. The transformer T is preferably of the heavy duty type with built-in motor-controlled reactors. The current source should include sufficient adjustable reactance to permit continuous adjustment and control of the amperage in the welding circuit C during the welding operation. The actual voltage at the welding zone is generally adjusted through voltage control apparatus (not shown) at approximately 30 to 50 volts, depending on the size and shape of the weld.

A high-frequency source S of electrical energy is provided with an output circuit 16 including a switch 17. The output circuit 16 of the high-frequency source S is inductively coupled to the welding circuit C by means of a primary coil 18 in the circuit 16, and a secondary coil 19 in the welding circuit C. The high-frequency source S may be any radio frequency oscillator operative at frequencies above about 1000 kilocycles. The high-frequency source S is inductively coupled, as shown, to the welding circuit C so that the necessary voltage and current for the starting operation, suitably about 20,000 to 50,000 volts at approximately 2 amperes, is developed between the rod R and the work, the secondary coupling coil 19 being designed to permit the main welding current to pass through such coil without overloading it.

In order to prevent the high-frequency energy from interfering with the electric welding supply circuit, a by-pass condenser B is connected across the secondary winding 14 of the transformer T. Interference of the high-frequency energy with other electrical control circuits of the welding system may also be prevented by suitable means in the form of high-frequency chokes and by-pass condensers. In case vacuum tubes are used in the control circuit, a small by-pass condenser may be inserted between the control grids and cathodes of such tubes to prevent any radio frequency voltage differential at this point.

In operation, the electric welding system is used as it would be normally with the exception that the distance between the lower end 10 of the rod R and the work is set to provide a gap of predetermined length such as one of the order of $\frac{1}{32}$ to $\frac{1}{16}$ inch, for example, and this gap is bridged by particles of the same welding material that covers the adjoining portion of the work and the end of the electrode. The high-frequency source S energizes such gap by sparking or otherwise discharging across it to provide a localized electrically conductive path, permitting the welding operation to be automatically started. Each piece of work may be successively connected in the welding circuit C while the circuit C is continuously energized from the source of electric welding energy and from the auxiliary source S of high-frequency electric energy so that sparking takes place within the material M between the end 10 of the electrode R and the work. With this arrangement, the invention has been used successfully to initiate the start of an automatic and highly repetitive electric welding cycle which made a small circular weld in about 7 seconds per welding cycle. This weld was made using $\frac{3}{32}$ inch fusible metal welding rod and powdered welding material. Welding was carried out at 240 amperes and 25 volts with six seconds of actual welding time per weld.

Where direct current is used for welding, the transformer T would of course be omitted from the welding circuit C. In any case, the invention results in rapid starting of the welding operation, which entirely avoids the use of the special starting fuse that has been used in the past. The starting operation may be automatic or controlled manually, as desired. The use of radio frequencies for the starting current prevents fatal shock to the operator and permits filtering of such current from the control circuits.

What is claimed is:

A repetitive blanketed electric fusion welding process which comprises successively connecting each part of the work to be welded in a welding circuit including a fusible electrode the end of which is separated from the work by a bridge of granulated solid mineral-like welding material that is substantially non-conductive when cold, and energizing said circuit from a source of electric welding energy and an auxiliary source of high-frequency electric energy so that sparking takes place across the bridge of granulated material between the end of said fusible electrode and the work, thereby establishing a path sufficiently conductive to automatically start the fusion welding operation under the blanket of granulated welding material as each part of work is successively connected in the welding circuit.

EDWARD D. MORRIS.

REFERENCES CITED

The following references are of record in the file of this patent:

UNITED STATES PATENTS

| Number | Name | Date |
|---|---|---|
| 2,139,160 | Hebeler | Dec. 6, 1938 |
| 2,191,469 | Hopkins | Feb. 27, 1940 |
| 2,043,960 | Jones et al. | June 9, 1936 |
| 1,979,944 | Kost | Nov. 6, 1934 |
| 2,173,450 | Larsen et al. | Sept. 19, 1939 |
| 1,570,803 | Walker | Jan. 26, 1926 |
| 2,365,612 | White et al. | Dec. 19, 1944 |
| 2,330,601 | Larsen | Sept. 28, 1943 |